(No Model.)
J. A. ERICKSON.
LUBRICATOR.
No. 540,966.   Patented June 11, 1895.
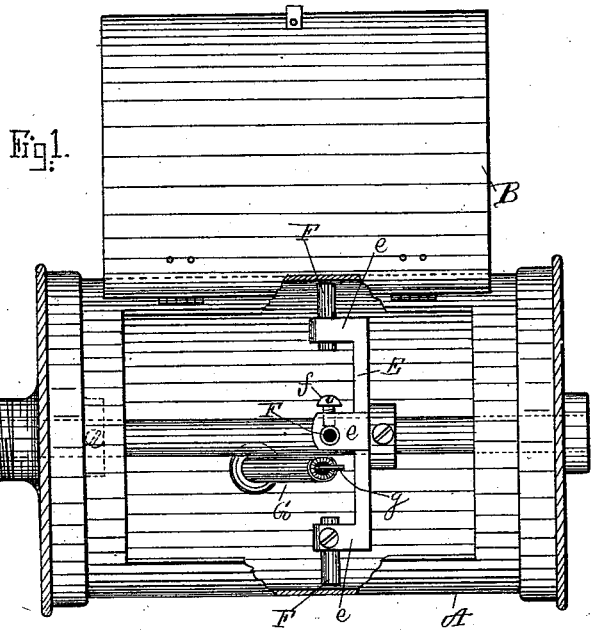
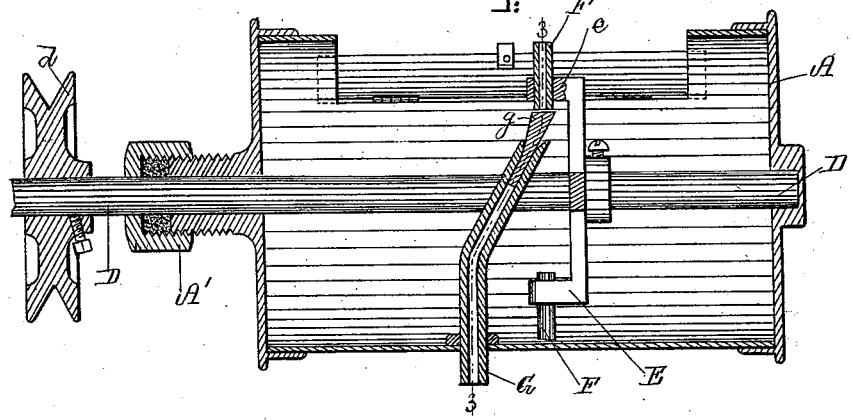
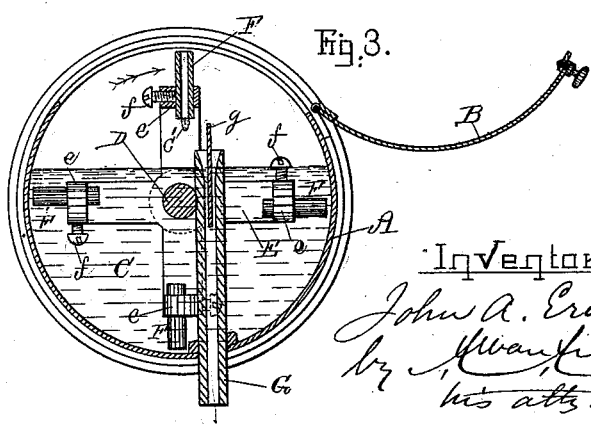
Witnesses.
Lauritz N. Möller
Henry R. Page
Inventor.
John A. Erickson,
by Alvan Andrew
his atty.

UNITED STATES PATENT OFFICE.

JOHN A. ERICKSON, OF MALDEN, MASSACHUSETTS.

LUBRICATOR.

SPECIFICATION forming part of Letters Patent No. 540,966, dated June 11, 1895.

Application filed January 22, 1895. Serial No. 535,787. (No model.)

*To all whom it may concern:*

Be it known that I, JOHN A. ERICKSON, a citizen of the United States, and a resident of Malden, in the county of Middlesex and State of Massachusetts, have invented new and useful Improvements in Lubricators, of which the following, taken in connection with the accompanying drawings, is a specification.

This invention relates to improvements in lubricators for engines, bearings, slides and general machinery, and it is carried out as follows, reference being had to the accompanying drawings, wherein—

Figure 1 represents a top plan view of the improved lubricator. Fig. 2 represents a longitudinal cross-section of the same, and Fig. 3 represents a cross-section on the line 3 3, shown in Fig. 2.

Similar letters refer to similar parts wherever they occur on the different parts of the drawings.

A represents the stationary oil chamber or receptacle having a hinged cover B which is normally closed against the top of the oil chamber when the lubricator is in use and it is swung open as shown in the drawings whenever it is desired to fill or partially fill the chamber A with the lubricant C, as shown in Fig. 3.

In bearings in the sides of the receptacle or casing A is journaled the shaft or spindle D, one of said bearings being preferably provided with a stuffing box A' as shown in Figs. 1 and 2 for the purpose of preventing leakage of the lubricant.

The shaft D is set in a rotary or intermittent rotary motion in any suitable manner and I wish to state that I do not confine myself to any particular mechanism for this purpose.

In the drawings Figs. 1 and 2 I have shown a grooved pulley d secured to one end of the shaft D to which a rotary or intermittent rotary motion may be applied by means of a belt, cord or chain thus imparting such motion to said pulley and its shaft, but any well known means for rotating or intermittently rotating said shaft D may be employed without departing from the essence of my invention.

To the shaft D inside of the chamber A is secured one or more wheels preferably composed of radial arms E, E, having each a horizontal projection e as shown which projections are perforated and adapted to receive the take up tubes F, F, which are adjustably secured to said wheel projections e by means of set screws f whereby a rigid connection is provided as shown in Figs. 1 and 3.

G is the discharge pipe, one for each wheel E leading from the upper interior portion of the chamber A to the bearing, slide or other parts of the machine or engine that are to be lubricated.

The upper end of the discharge tube G extends a little above the level of the lubricant in the chamber A as shown in Fig. 3.

Within the upper end of the discharge tube G is centrally secured a wing or sweeper g the upper end of which reaches nearly to the under side of the lower ends of the take up tubes F as the latter pass by such wing or sweeper when at their highest position during their rotation as shown in Figs. 2 and 3.

The operation is as follows:—During the rotation of the arms E, E, their take up tubes F dip into the liquid lubricant and retain a portion thereof within them and as each such take up tube reaches its upper position, a drop of lubricant C' hangs below the lower end of such take up tube as shown in Fig. 3, which drop as it passes by the sweeper g is taken up by the latter and deposited into the discharge tube G. By means of the set screws f, the take up tubes F F are rigidly connected with the projections e of the radial wheel arms E and are yet adjustable therein toward and from the centrally located sweeper g of the discharge tube G, and it will be observed that the take up tubes are so adjusted and arranged that they will never come in contact with the delivery tube or its sweeper, but only the oil drop depending from the uppermost tube, as it passes the discharge tube G, is taken off by the sweeper and thereby converged into the discharge tube. Consequently there is no wear or rattle of these parts and the lubricator is absolutely noiseless. The sweeper g being supported centrally in the upper end of the discharge tubes the whole of the oil drop hanging onto the take up tube F will be converged into the discharge tube G and no part will be brushed off to the outside of said tube as would occur if the centrally supported sweeper was omitted.

The shaft D may be speeded according to the amount of lubricant that is to be conveyed to the discharge tube G.

What I wish to secure by Letters Patent and claim is—

The herein described lubricator, consisting of an oil receptacle having a discharge tube G provided with a wing or sweeper g centrally mounted in its upper end, combined with a rotary wheel mounted in the oil receptacle and comprising a series of radial arms E and take up tubes F rigidly supported by said arms and adjustable toward and from the sweeper g, substantially as and for the purpose set forth.

In testimony whereof I have signed my name to this specification, in the presence of two subscribing witnesses, on this 19th day of December, A. D. 1894.

JOHN A. ERICKSON.

Witnesses:
 ALBAN ANDRÉN,
 LAURETZ N. MÖLLER.